United States Patent [19]

Keller et al.

[11] Patent Number: 5,785,129
[45] Date of Patent: Jul. 28, 1998

[54] ROW CROP CULTIVATOR HAVING A FIXED DEPTH OF PENETRATION

[76] Inventors: Russell J. Keller, HC1 Box 2; Steven D. Keller, HC1 Box 4, both of Tintah, Minn. 56583

[21] Appl. No.: 796,656

[22] Filed: Feb. 5, 1997

Related U.S. Application Data

[63] Continuation of Ser. No. 565,972, Dec. 1, 1995, abandoned.

[51] Int. Cl.[6] .................................................. A01B 5/00
[52] U.S. Cl. ..................... 172/536; 172/551; 172/574; 172/572
[58] Field of Search .......................... 172/536, 539, 172/624.5, 551, 510, 515, 516, 566, 239, 572–576; 111/35, 88

[56] References Cited

U.S. PATENT DOCUMENTS

| | | | |
|---|---|---|---|
| 961,113 | 6/1910 | Ewing | 172/536 |
| 1,072,292 | 9/1913 | Wyss | 172/536 |
| 1,149,992 | 8/1915 | Brennan, Jr. | 172/536 |
| 1,416,106 | 5/1922 | McWhorter | 172/536 |
| 1,442,700 | 1/1923 | Phelps | 172/536 |
| 1,790,089 | 1/1931 | Cady | 172/536 |
| 1,868,539 | 7/1932 | Morkovski | 172/536 |
| 1,901,299 | 3/1933 | Johnson | 172/536 |
| 2,258,626 | 10/1941 | Satrom | 172/536 |
| 2,685,243 | 8/1954 | Cole | 172/536 |
| 2,941,606 | 6/1960 | Gillette | 172/624.5 X |
| 3,452,826 | 7/1969 | Lehman . | |
| 3,804,179 | 4/1974 | Johnson | 172/624.5 X |
| 4,004,640 | 1/1977 | Bland . | |
| 4,121,669 | 10/1978 | Sosalla | 172/624.5 X |
| 4,333,535 | 6/1982 | Hentrich, Sr. . | |
| 4,356,780 | 11/1982 | Bauman . | |
| 4,407,372 | 10/1983 | Rozeboom . | |
| 4,408,551 | 10/1983 | Keller et al. | 172/536 X |
| 4,432,292 | 2/1984 | Scott . | |
| 4,493,274 | 1/1985 | Robinson, Jr. et al. | 172/536 X |
| 4,579,179 | 4/1986 | Vachon | 172/624.5 X |
| 4,660,653 | 4/1987 | Mayeda et al. | 172/624.5 X |
| 4,733,730 | 3/1988 | Murray | 172/536 X |
| 4,744,316 | 5/1988 | Lienemann et al. . | |
| 4,786,113 | 11/1988 | Vandenberg | 172/536 X |
| 4,796,550 | 1/1989 | Van Natta et al. | 172/536 X |
| 4,819,737 | 4/1989 | Frase | 172/624.5 X |
| 4,828,042 | 5/1989 | Arnold . | |
| 4,834,189 | 5/1989 | Peterson et al. | 172/624.5 X |
| 4,974,683 | 12/1990 | Hanig et al. . | |
| 5,394,946 | 3/1995 | Clifton et al. | 172/536 X |
| 5,509,363 | 4/1996 | Zimmerman | 172/536 X |
| 5,529,128 | 6/1996 | Peterson et al. | 172/624.5 X |

OTHER PUBLICATIONS

John Deere Tool Carriers and Toolbars Brochure, pp. 1,3, 14,24,25, Oct. 1983.

*Primary Examiner*—Terry Lee Melius
*Assistant Examiner*—Victor Batson
*Attorney, Agent, or Firm*—Jones, Day, Reavis & Pogue

[57] ABSTRACT

A row crop cultivator has a plurality of domed discs suspended in pairs from a suspension system in which the discs are firmly restrained against lateral movement relative to the crop row being cultivated but are free to move vertically to adjust to uneven conditions or obstacles of the ground. A generally cylindrical band is fixed to one side of each disc and has a smaller diameter than the disc diameter defining a cylindrical surface which rides on the surface of the ground and permits the disc to penetrate the soil only to a predetermined depth. The cylindrical surface if of sufficient width that it supports the disc in a floating manner over the ground and a uniform depth of cultivation is achieved, whereby damage to crops from excessive disc penetration is avoided.

5 Claims, 4 Drawing Sheets

ROW CROP CULTIVATOR HAVING A FIXED DEPTH OF PENETRATION

This is a continuation of application Ser. No. 08/565,972, filed on Dec. 1, 1995, now abandoned.

BACKGROUND OF THE INVENTION

1. Field of the Invention

The present invention relates generally to a row crop cultivator of the type employing discs to unearth weeds on opposite sides of rows of field crops and, more particularly, to a cultivator having means for controlling each disc, individually, to a pre-selected depth of disc penetration while allowing the disc to ride over irregular ground conditions and thereby minimize possible disc damage.

2. Description of the Prior Art

Row crop cultivators using gangs of circular steel discs have long been used to till soil and thereby prevent weed growth from overtaking and stunting the growth of row crops. Many forms of such cultivators are commonly designed to be pulled behind a tractor. To this end, they typically comprise a draw bar having means to support discs for rotation at spaced intervals, with the draw bar oriented transversely to the rows of crop plants. It is also well known to use pairs of discs with the discs arranged in a V-like fashion and spaced from one another such that the two discs can pass on opposite sides of a row of plants. By properly selecting the pitch angle of the discs with respect to the row axis, the discs can rotate but also drag against and dig into the soil thereby unearthing unwanted weed growth. Discs may also be combined with tooth gangs to provide a cultivator having the capability of completely eliminating weeds between rows of crops in a single pass of the cultivator.

While disc gangs may be supported on wheels which serve to ride over the ground surface and adjust the gang assembly to irregular soil conditions, it has been found desirable to mount discs with various linkage arrangements such that they can individually "float" or ride over obstacles in the soil. Thus, when pulling the disc gang each individual disc is capable of riding over a rock or stump, for example, without jarring the disc gang and causing other discs to be raised out of the ground and skip. A disc suspension system of such a type as used in connection with a harrow is disclosed, for example, in U.S. Pat. No. 4,333,535. In this example, discs are each pivotably connected to a frame and are biased by a compression spring which absorbs vertical shock imposed on the disc when rocks or the like are encountered by the disc.

A disadvantage of known disc cultivators is that the discs have a tendency to seek their own individual depth of soil penetration depending on conditions of the soil. This is true of fixed disc mounting arrangements as well as the above-described floating disc arrangements. Particularly where soil conditions vary in the field which is being cultivated and exhibit loose soil characteristics in patches, the cultivator disc can penetrate the soil more deeply in such patches and cultivate the soil too closely to the rows of crops. The result can be that the leaves of the crop plants can be severed or the plant roots can become exposed to wind and drying conditions. Both results can be damaging to the crop yield.

Attempts have been made to regulate the depth of penetration of discs used in planting equipment. These types of discs are typically flat discs as opposed to domed discs used in cultivating. One such attempt involved fixing a cylindrical band to the side of the flat disc such that the disc was limited to a predetermined depth of soil penetration, whereby a furrow of uniform depth was intended to be created. However, this attempt largely failed and was abandoned because the planting depth of typical planters, and hence the depth of the furrow created by the disc, is necessarily very shallow. Because of this shallow depth, mud and dirt accumulation on the discs and their associated depth bands could not be eliminated by any form of scrapers because of insufficient frictional interaction between the disc and soil necessary to cause continued rotational movement of the disc. Thus, the discs were unable to clean themselves of mud and dirt accumulation and would consequently bind and begin plowing through the soil unacceptably. Because of the failure of such depth bands in disc-type planters, it was considered undesirable to use any such system with disc apparatus of all types. Accordingly, it has not been known to use depth band systems with disc-type cultivators. As a consequence, the problems of excessive soil penetration of known disc cultivators is a problem which has gone unsolved to the present time.

It is, therefore, desirable to provide a disc cultivator with the capability of having individually "floating" discs for absorbing shocks associated with irregular ground conditions or soil obstacles such as rocks or stumps. It is further desirable to provide a disc cultivator in which the discs can individually adjust to a controlled depth or maximum soil penetration whereupon damage to the crop from excessive penetration is avoided. Still further, it is desirable to provide a disc cultivator in which the discs float more freely over obstacles and are protected from damage due to abrupt contact with rocks or other hard obstacles.

SUMMARY OF THE INVENTION

The present invention overcomes the disadvantages of the prior art by providing a row crop cultivator having a plurality of discs suspended in pairs from a suspension system in which the discs are firmly restrained against lateral movement relative to the crop row being cultivated but are free to move vertically to adjust to uneven conditions or obstacles of the ground. A generally cylindrical band is fixed to one side of each disc and has a smaller diameter than the disc diameter defining a cylindrical surface which rides on the surface of the ground and permits the disc to penetrate the soil only to a predetermined depth. The cylindrical surface is of sufficient width that it supports the disc in a floating manner over the ground with disc penetration controlled to a maximum depth equal to the difference between the radius of the disc and the radius of the band. Because a pre-selected penetration depth of at least two inches has been found desirable for many cultivating operations, a two-inch or greater penetration in most types of soils allows for sufficient frictional engagement between the disc and soil to permit scraper blades to be used to eliminate accumulation of mud and dirt on both the band and disc. Thereby, the disc is freely rotatable to a uniform depth of cultivating action, whereupon damage to the row crop from excessive disc penetration is avoided.

BRIEF DESCRIPTION OF THE DRAWINGS

The foregoing and other novel features and advantages of the invention will be better understood upon a reading of the following detailed description taken in conjunction with the accompanying drawing, wherein.

DETAILED DESCRIPTION OF THE PREFERRED EMBODIMENT

Figure 1:
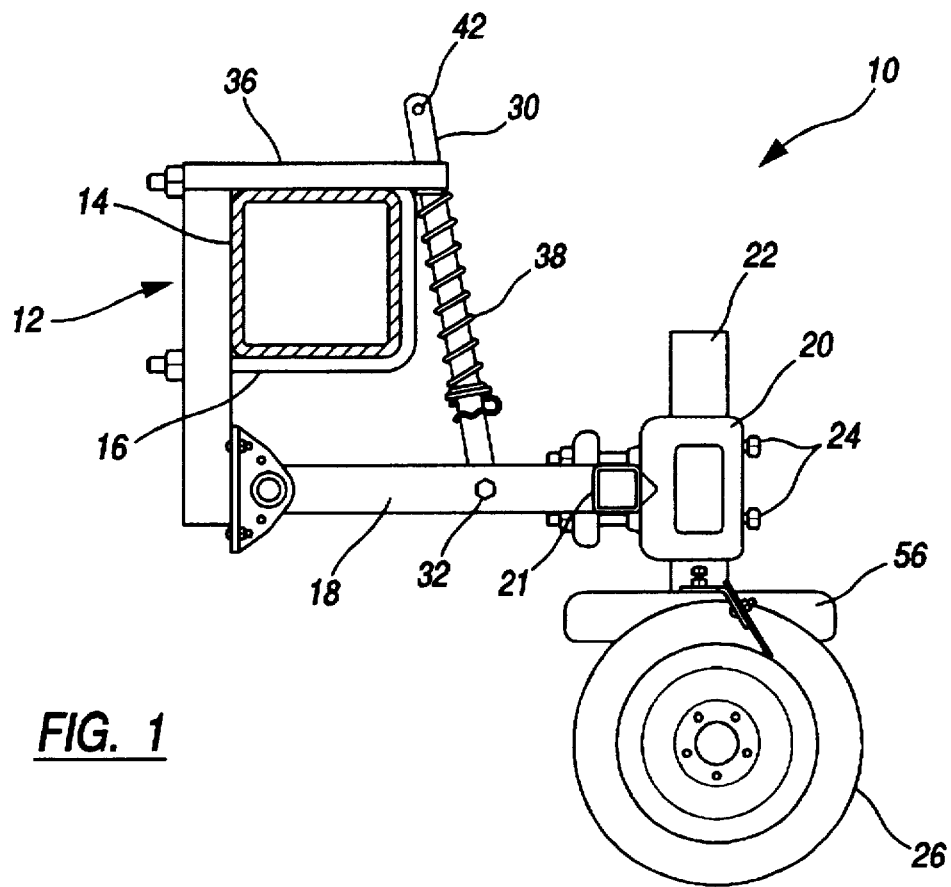
FIG. 1 is a side view of a disc support assembly as used on a cultivator constructed in accordance with the present invention.
Figure 2:
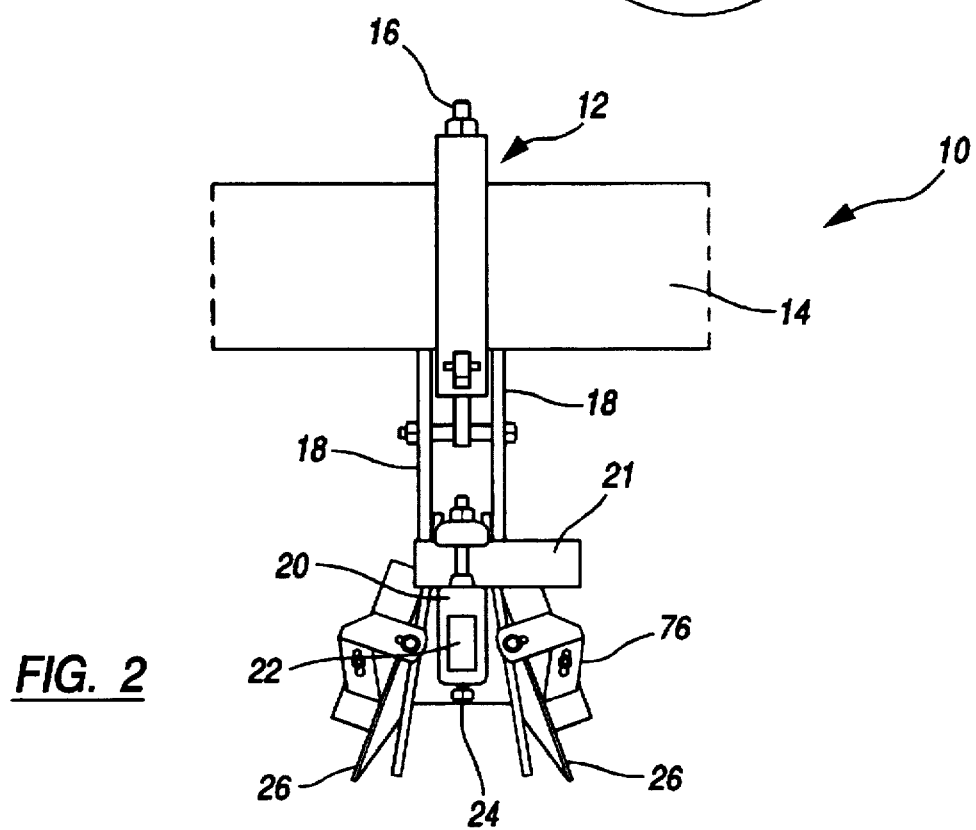
FIG. 2 is a top view of the disc support assembly shown in FIG. 1.

Referring now to the drawing, and initially to FIGS. 1 and 2, a disc support assembly for a row crop cultivator is designated generally by the reference numeral 10 and includes a bracket 12 which is mountable to a draw bar 14 by a suitable U-bolt 16. The illustrated draw bar 14 is of square-tube construction, however, other forms of draw bars may be used. The draw bar 14 may be part of a frame (not shown) which in conventional manner is supported by wheels such that the draw bar 14 extends transversely to rows of crops as the frame is pulled by a tractor lengthwise of the crop rows. Although only one disc support assembly 10 is illustrated in FIGS. 1 and 2, it will be appreciated that the draw bar 14 is typically of sufficient length as to support multiple assemblies 10 at regular spaced intervals along the draw bar 14 for cultivating multiple rows of crop plants at the same time.

Pivotably attached to the bracket 12, in a manner which will be described in detail hereinafter, is a pair of main pivot arms 18. A bracket 20 is attached to a transverse tube 21 connected to the free end of the pivot arms 18 and defines a vertical passageway for slidably receiving a bar 22. The bar 22 is vertically adjustable within the passageway of the bracket 20 and can be locked in a preferred position by set screws 24. The bar 22, in turn, supports a pair of preferably dome-type steel discs 26, as will be described in detail hereinafter.

By the foregoing arrangement, it can be seen that the discs 26 are pivotably supported relative to the draw bar 14 and, therefore, may move vertically to adjust to uneven ground conditions. As seen in FIGS. 1 and 2, a link 30 is pivotably connected to the pivot arms 18 at a pin 32 spaced from the bracket 12. The link 30, in turn, extends through an aperture 34 of an arm 36 extending horizontally from the bracket 12 over the top of the draw bar 14. A compression spring 38 is fitted over the link 30 as to freely slide on the link 30 and is normally compressed between the bracket arm 36 and the pin 32 extending through the link 30 when the discs 26 are at rest on the ground. The spring 38 thereby exerts a downward force on the arms 18, and thus the discs 26, as to normally bias the discs 26 into engagement with the soil to be cultivated. A stop pin 42 prevents the link 30 from completely sliding out of the aperture 34 when the assembly 10 is raised off the ground, such as in transportation. It can thus be seen that the discs 26 are supported for downwardly biased limited vertical movement relative to the draw bar 14. However, they are firmly restrained against lateral movement such that they can be drawn along a crop row and maintain a true line of travel without damaging crop plants.

Figure 3:
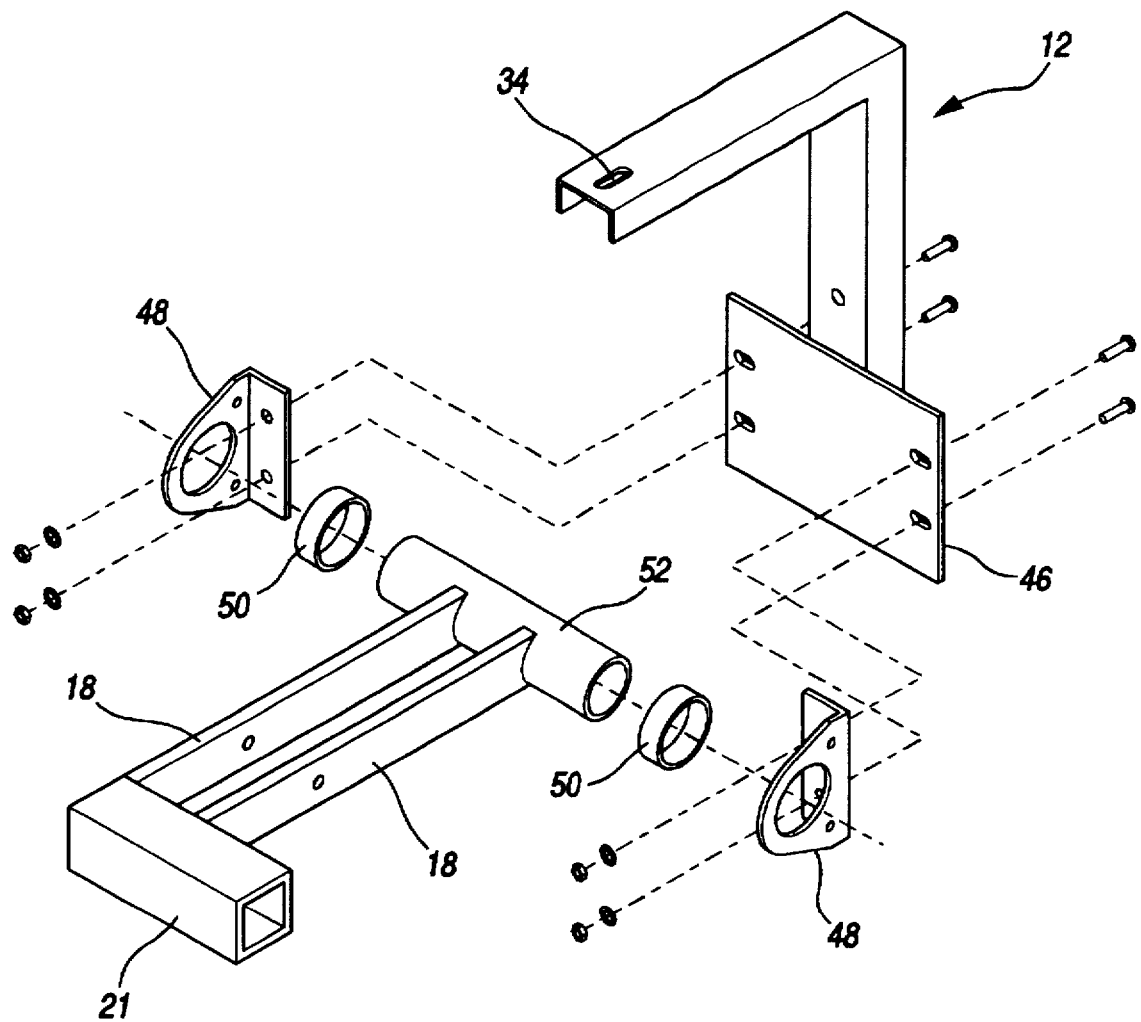
FIG. 3 is an exploded perspective view of a pivot arm and mounting bracket of the disc support assembly.

The details of the bracket 12 and pivot arm 18 assembly are shown in FIG. 3. The bracket 12 is provided with a plate 46 to which a pair of spaced bearing blocks 48 are bolted. The bearing blocks 48 each support a bearing 50 which, in turn, support a transverse shaft 52. The shaft 52 is connected to the pivot arms 18, thus permitting the arms 18 to freely pivot on the bearings 50.

Figure 4:
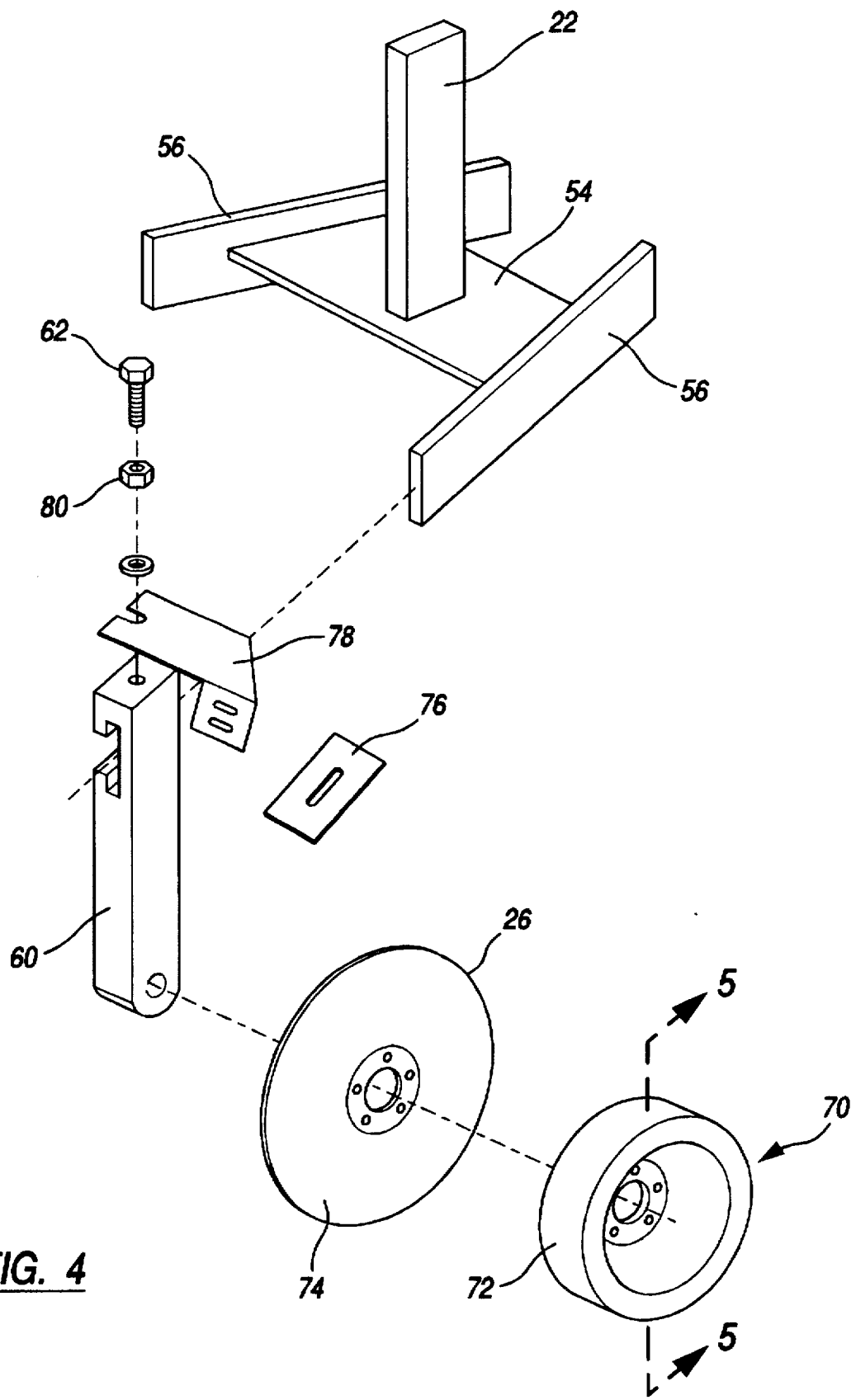
FIG. 4 is an exploded perspective view of a disc assembly constructed in accordance with the invention.

Turning now to FIG. 4, further details of the disc 26 mounting assembly 10 can be seen. Preferably, the mounting assemblies are of a standard type commercially available from a manufacturer such as Alloway, for example. Connected to the bar 22 is a trapezoidally shaped plate 54 which rigidly supports a pair of horizontally disposed arms 56. The geometry of the plate 54 is such that the arms 56 are each supported at a pitch angle relative to the intended direction of travel of the assembly 10. A pair of vertically disposed disc arms 60 (only one of which is shown in FIG. 4) are slideably connected to the arms 56 and may be adjusted to a desired mounted position. The discs 26 are supported for rotation by a suitable bearing (not shown) to the lower ends of the arms 60. By the angled arrangement of the arms 56, the discs 26 may be adjusted to a preferred separation distance by movement of the arms 60 either forwardly or rearwardly, thus allowing for adjustment of the cultivator to accommodate the size of the crop plants being cultivated. Suitable set screws 62 serve to lock the arms 60 in the desired position.

In accordance with the invention, the discs 26 are provided with depth bands 70 extending outwardly from the concavely shaped sides of the discs 26. The bands 70 may be rigidly mounted to the discs by suitable bolts and are mounted concentrically with the discs 26 as to have their central axes of rotation coincident with the axes of rotation of the discs 26. The bands 70 define generally horizontally disposed cylindrically surfaces 72. The bands 70 are also smaller in diameter than the diameters of the discs 26. Thus, marginal portions 74 of the discs are free to penetrate the soil while the surfaces 72 of the bands 70 ride over the ground surface, thereby limiting the depth of penetration of the discs 26 to essentially a depth equal to the difference between the radii of the disc 26 and band 70, respectively. Preferably, the disc 26 mounting assembly includes adjustable scraper blades 76 supported by blade holders 78 which are secured to the disc arms 60 by the set screws 62 and suitable jam nuts 80. The blades 76 may thereby be adjusted to simultaneously dislodge accumulated soil from both the surfaces 72 of the depth bands 70 and the marginal portions 74 of the discs 26.

Figure 5:
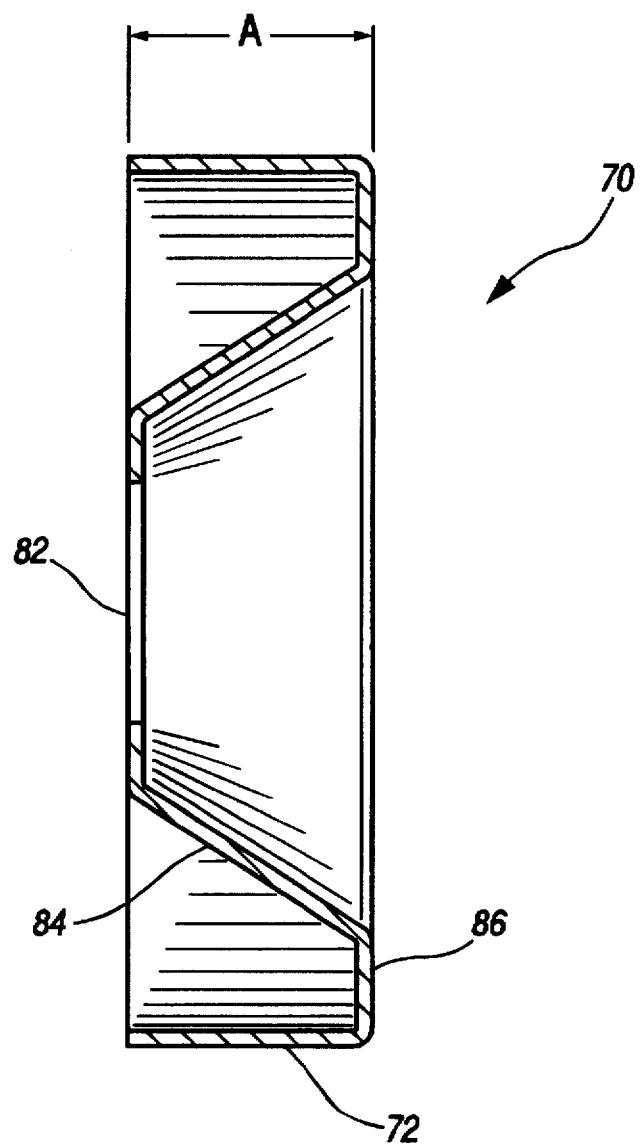
FIG. 5 is a cross-sectional view of a depth band constructed in accordance with the invention taken substantially along the line 5—5 of FIG. 4.

Turning now to FIG. 5, a depth band 70 in accordance with the present invention is illustrated in cross-section and is preferably an integrally formed member stamped from suitable sheet metal. In a most preferred form, the bands 70 have a central annular flange portion 82 dimensioned and configured to conveniently bolt to a standard disc 26 hub. A conical portion 84 connects to a rim portion 86 which in turn connects to surface portion 72. The conical portion 84 serves to minimize accumulation of soil within the interior of the band 70.

It can now be appreciated that a cultivator assembly 10 of the present invention offers considerable advantages in the cultivation of row crops wherein soil conditions vary. For example, in loose soil conditions in which a disc would tend to penetrate the soil too deeply, the surface 72 of the depth band 70 will support the disc 26 at a controlled depth. Therefore, severing of plant leaves or root exposure is avoided as the cultivator 10 is pulled along the crop rows. Moreover, the bands 70 also serve to allow the discs 26 to "float" more freely over obstacles in the ground such as rocks or stumps. Therefore, a smoother operation of the assembly 10 is made possible. Preferably, a depth of disc 26 penetration of two inches is desirable for cultivating row crops of common varieties. Thus, for a standard disc 26 having a twelve-inch diameter, a band 54 diameter of eight inches has proven to be most desirable. With this depth of soil penetration in most soils, there is adequate frictional engagement between the disc 26 and soil to allow the disc 26 to freely rotate while still permitting removal of accumulated mud or dirt by the scraper blades 76. It is also preferred to provide a band 70 having a width projecting outwardly of the disc 26 of on the order of two inches, or so, as measured at A in FIG. 5. In this way, the surface 72 of the band 70 can sufficiently support the weight of the disc assembly on the ground surface over normal conditions of the typical soil.

While the present invention has been described in connection with a preferred embodiment thereof, it will be understood by those skilled in the art that many changes and modifications may be made without departing from the true spirit and scope of the invention. Accordingly, it is intended by the appended claims to cover all such changes and modifications as come within the true spirit and scope of the invention.

What is claimed is:

1. A row crop cultivator of the type used to unearth weeds on opposite sides of rows of field crops comprising:

a generally elongate draw bar configured to be drawn above multiple rows of crop plants with said draw bar oriented transversely to said rows;

a plurality of disc suspension systems operatively connected to said draw bar at spaced intervals;

a pair of generally circular discs journalled for rotation on each of said disc suspension systems;

said disc suspension systems being configured to restrain said discs against lateral movement relative to said rows when said draw bar is dawn lengthwise of said rows while allowing limited vertical movement of said discs to permit said discs to adjust vertically to irregular conditions of a field; and a generally cylindrical band fixed to at least one side of each disc and having a diameter which is smaller than the diameter of said disc, said band being disposed concentrically about the axis of rotation of said disc and having a generally cylindrical surface oriented substantially parallel to the surface of the field, said band further being an integrally formed sheet metal member with said cylindrical surface connected by a conical portion to a central mounting flange portion;

wherein said cylindrical surface is of sufficient width to ride along the surface of the field and limit the depth of penetration of the disc into the field to a maximum depth equal to the difference between the radius of the disc and the radius of the band.

2. The cultivator of claim 1 wherein said maximum depth of penetration is approximately two inches.

3. The cultivator of claim 1 wherein said disc has a diameter of approximately twelve inches and said band has a diameter of approximately eight inches.

4. The cultivator of claim 1 wherein said suspension systems include scraper blades configured to simultaneously dislodge accumulation of mud or dirt from said discs and bands.

5. The cultivator of claim 1 wherein said cylindrical surface of said band has a width of approximately two inches.

* * * * *